United States Patent
Hupp et al.

(10) Patent No.: US 7,979,069 B2
(45) Date of Patent: Jul. 12, 2011

(54) MOBILE DEVICE AND BASE STATION FOR A COMMUNICATION PROTOCOL WITH NORMAL LOGIN AND TEMPORARY LOGIN

(75) Inventors: Jürgen Hupp, Nuremberg (DE); Martin Tittel, Forchheim (DE); Roland Sturm, Nuremberg (DE); Doris Mack, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 902 days.

(21) Appl. No.: 11/840,270

(22) Filed: Aug. 17, 2007

(65) Prior Publication Data

US 2008/0020764 A1    Jan. 24, 2008

Related U.S. Application Data

(63) Continuation of application No. PCT/EP2005/010786, filed on Oct. 6, 2005.

(30) Foreign Application Priority Data

Mar. 2, 2005    (DE) .......................... 10 2005 009 504

(51) Int. Cl.
*H04W 4/00* (2009.01)

(52) U.S. Cl. ..................... 455/435.1; 455/433; 455/434; 455/411

(58) Field of Classification Search .................. 455/433, 455/434, 435.1, 411
See application file for complete search history.

(56) References Cited

U.S. PATENT DOCUMENTS

| | | |
|---|---|---|
| 5,625,888 A | 4/1997 | Ruther et al. |
| 5,642,398 A | 6/1997 | Tiedemann, Jr. et al. |
| 6,574,452 B1 | 6/2003 | Morvan et al. |
| 6,618,595 B1 | 9/2003 | Biedermann et al. |
| 7,069,433 B1 * | 6/2006 | Henry et al. ................... 713/151 |
| 2002/0046179 A1 * | 4/2002 | Kokudo ........................... 705/51 |
| 2003/0007474 A1 * | 1/2003 | Lansio et al. ................. 370/338 |

(Continued)

FOREIGN PATENT DOCUMENTS

DE    42 36 778 A1    5/1994

(Continued)

OTHER PUBLICATIONS

English translation of the Official communication issued in counterpart International Application No. PCT/EP2005/010786, mailed on Jan. 31, 2008.

(Continued)

*Primary Examiner* — Jinsong Hu
*Assistant Examiner* — Dung Hong
(74) *Attorney, Agent, or Firm* — Keating & Bennett, LLP

(57) ABSTRACT

A mobile device communicates with a base station according to a communication protocol, the communication protocol having a first message for signaling a readiness of the base station for a normal login operation of the mobile device with the base station and a second message for signaling a readiness of the base station for an ad-hoc login operation of the mobile device with the base station, so that the ad-hoc login information of the ad-hoc login operation can be distinguished from the normal login information of the normal login operation. To this end, the mobile device has a receiver, an interpreter and a processor, which is formed so as to perform the ad-hoc login operation when the readiness of the base station for an ad-hoc login operation is signaled.

21 Claims, 3 Drawing Sheets

U.S. PATENT DOCUMENTS

2003/0069012 A1  4/2003  Griep et al.
2004/0165563 A1  8/2004  Hsu et al.
2004/0235452 A1* 11/2004 Fischer et al. ............... 455/410
2004/0259544 A1 12/2004  Amos

FOREIGN PATENT DOCUMENTS

DE    196 10 086 A1       9/1997
EP    0 849 963 A2        6/1998
GB    2389010 A       *  11/2003
WO    2004/016012 A1      2/2004

OTHER PUBLICATIONS

Official communication issued in the counterpart International Application No. PCT/EP2005/010786, mailed on Jan. 24, 2006.
Official communication issued in the counterpart International Application No. PCT/EP2005/010786, mailed on Jan. 24, 2006.
Official Communication issued in corresponding Canadian Patent Application No. 2,601,972, issued on Mar. 25, 2011.

* cited by examiner

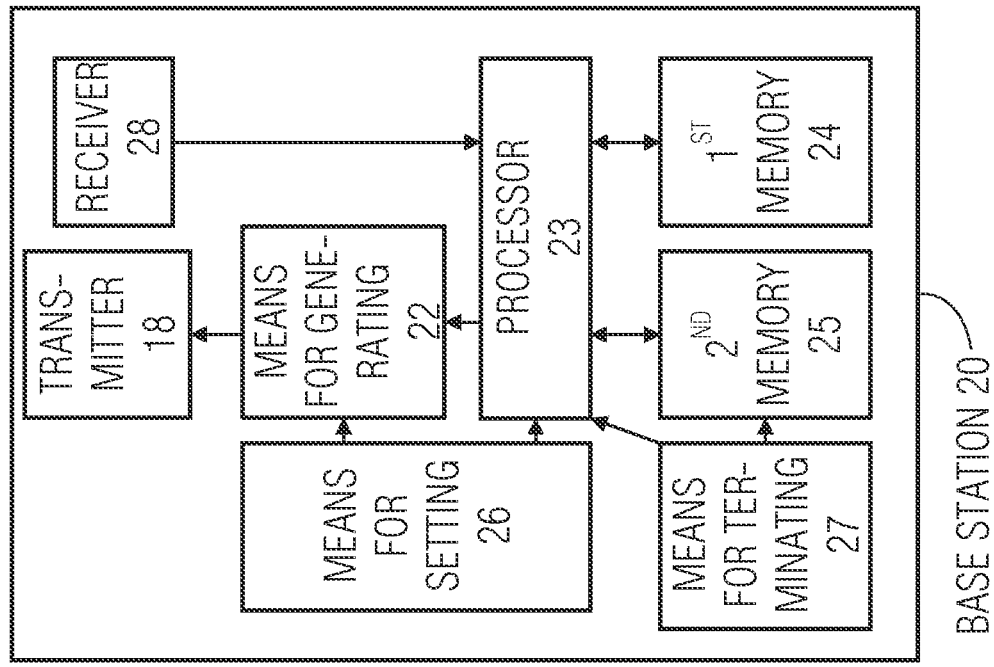
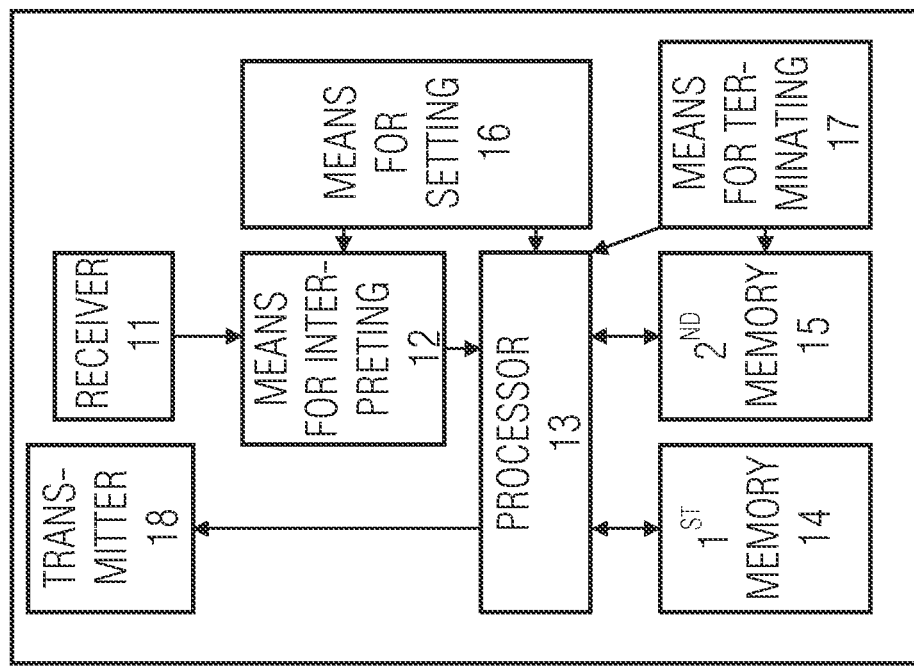

FIGURE 2

A FIELD 40

A FIELD HEADER;A FIELD INFORMATION (TAIL) 42
TAIL IDENTIFIER:CHANNEL $Q_H$ 43;

| HEADER BITS 0.7 | TAIL BITS 8.11 | BITS 12.15 | BITS 16.23 | BITS 24.31 | BITS 32.39 | BITS 40.47 |
|---|---|---|---|---|---|---|
| TA = $Q_T$ = | $Q_H$ = ESC | IIS-Hdr = 0 | UNOCCUPIED | UNOCCUPIED | UNOCCUPIED | UNOCCUPIED |
| 100x xxxx | 0111 | 0000 | 0000 0000 | 0000 0000 | 0000 0000 | 0000 0000 |

FIGURE 4
PRIOR ART

| HEADER BITS 0.7 | TAIL BITS 8.11 | BITS 12.15 | BITS 16.23 | BITS 24.31 | BITS 32.39 | BITS 40.47 |
|---|---|---|---|---|---|---|
| TA = $Q_T$ = | $Q_H$ | — | | | | a44 = 1 |
| 100x xxxx | 0011 | xxxx | xxxx xxxx | xxxx xxxx | xxxx xxxx | xxxx xxxx |

MOBILE DEVICE AND BASE STATION FOR A COMMUNICATION PROTOCOL WITH NORMAL LOGIN AND TEMPORARY LOGIN

CROSS-REFERENCE TO RELATED APPLICATIONS

This application is a continuation of copending International Application No. PCT/EP2005/010786, filed Oct. 6, 2005, which designated the United States and was not published in English.

BACKGROUND OF THE INVENTION

1. Field of the Invention

The present invention refers to digital message communications and, in particular, to a login of a mobile device with a base station according to a communication protocol.

2. Description of the Related Art

The login of a terminal plays a central role in all communication protocols in digital communication systems. The login occurs during a login operation defined by the communication protocol, which is performed rarely or once, namely when the terminal has to be used for the first time. After successful completion of the login operation, the terminal is logged in with the digital communication network and can then establish communication connections at will via the communication network. During the login operation, a clear identity for the digital communication system, e.g. a number or a network address, will be allocated to the terminal according to the communication protocol, based on which it can be identified or addressed in the future within the digital communication system.

In digital radio communication systems, in which the terminal, hereinafter referred to as mobile device, is connected to the communication system via the air interface through a base station, the control as to which mobile device is allowed to login is furthermore of central importance. Without control, any mobile device that supports the communication protocol of the digital radio communication system could also be logged-in without being authorized, and would thus have access to the communication system or could establish connections via the communication system. In order to minimize the risk of unauthorized logins, the mobile devices in corporate networks are usually not logged-in by the subscribers or users, but centrally by the system administration.

Known digital radio communication systems are e.g. GSM, UMTS, DECT, WLAN, and Bluetooth.

Subsequently, the login, and in particular the login operation, for a radio communication system is described, for example on the basis of the DECT (Digital Enhanced Cordless Telecommunication) standard. The DECT standard defines a radio-access technology, which can be used in private, corporate and public communication systems. The DECT standard supports a plurality of applications, ranging from speech and fax to data transmission. The ETSI DECT standard (ETS 300 175, part 1-7) describes the physical layer, which is also referred to as PHL, the medium access control layer, which is also referred to in short as MACL, the data link control layer, which is also referred to in short as DLCL, the network layer, which is also referred to in short as NL, as well as the login processes and security features of a communication system. Within the network layer, the Mobility Management (MM) unit is responsibly for the login, the authentication and the key allocation. A DECT communication system is comprised of at least one base station (Fixed Part: FP) and one or more mobile devices (Portable Part: PP). The DECT technology finds broad application especially in private and corporate communication systems.

In private DECT communication systems, 1 to 8 mobile devices can typically be logged-in and operated, wherein the mobile devices can communicate internally with each other and are connected to the public analog or ISDN network via the base station. In corporate DECT communication systems, a plurality of base stations are usually coupled to the private branch exchange, both internal and external communication connections with the public analog or ISDN network being possible via the mobile devices, like in the private DECT communication system.

In DECT communication systems, mobile devices and base stations are trained on each other, i.e., within the scope of a login operation (subscription), mobile device and base station exchange the identities and keys ("Access Rights Request Process") over the air. They are stored in non-volatile databases. Base station and mobile device can then communicate with each other. The access rights request process will now be described in greater detail, after an overview of the general packet structure of the DECT standard.

FIG. 3 shows the components of a DECT packet essential for the understanding of the login operation. The DECT packet is comprised of an S field, which is used for synchronization of the communication connection between the base station and the mobile device, and a D field for useful data, wherein the DECT packet may have different lengths. The D field is divided, in turn, into an A field for controlling the communication between the base station and the mobile device and a B field, which generally contains the application data. The A field has, in turn, an A field header, A field information and an R CRC field for saving the control data. The A field has a field length of 64 bits, the bits being designated in an increasing order from a0 for the first bit to a63 for the last bit. The A field header contains the first eight bits from a0 to a7, the A field information contains the bits a8 to a47, and the R CRC field contains the bits a48 to a63.

The first three bits of the A field header form the TA field, which is also referred to as tail identifier and which indicates the type of the A field information (a8 ... a47). There are five different logical channels, one of which respectively transmitting data in the A field. One of the logical channels is the channel $Q_T$, which is transmitted only by the base station and contains system information, such as on the equipment of the stationary station or on the current connection.

The bit $Q_1$ (a3) and the bit $Q_2$ (a7) serve for the quality control of the transmission. The BA field indicates the nature of the B field, e.g. protected or unprotected transmission of information.

Within the 40-bit A field information, which is also referred to as tail field, the transmission of internal MAC messages is also possible (note: as described above, there are several logical channels for the A-field).

The access rights request process permits the login of a mobile device with a base station through the air interface. To this end, the base station is placed, e.g. through pushing on a button or selecting from a menu, into readiness for the login operation. During the readiness for login, the base station signals to all mobile devices by means of a broadcast message that a login is possible at the base station.

FIG. 4 shows the structure of the A field without R CRC field and the specifics of the A field for signaling the readiness for the login operation of the base station. The readiness for the login operation of the base station is signalled via the logical channel $Q_T$, which is clearly defined by the tail identifier value "100" (a0 ... a2). In a $Q_T$ channel message, the bits a8 to a11 are defined as Q header, the Q header defines the type of the following A field bits a12 to a47. An Q header value $Q_H$="0011" means that the so-called "fixed part capabilities" are sent, the value 1 for the bit a44 signaling the readiness for the login operation of the base station.

Next, the mobile device is also placed into readiness for the login operation. Thereupon, the mobile device analyzes the broadcast message of the base station for the bit a44, if it identifies the readiness for the login operation of the base station by the bit value 1 for the bit a44, the mobile device starts the further login operation with an access rights request message. The access rights request message contains the identity of the mobile device as well as, optionally, further information, which defines e.g. the type of the authentication and encryption of the communication connections. After receiving the access rights request message, the base station processes the information contained therein and answers to the mobile device with an access rights accept message if it supports the type of the authentication and encryption given by the mobile device. The access rights accept message of the base station contains the identity of the mobile device, the identity of the base station as well as the type of the authentication and encryption of the communication connection given by the mobile device. After receiving the access rights accept message the mobile device stores its own identity, the identity of the base station and the type of the authentication and encryption agreed upon with the base station as a data set for the login of the mobile device with this base station. Likewise, the base station stores the identity of the mobile device and the type of the authentication and encryption of the communication connection agreed upon with the mobile device as a data set.

Herewith, the future UAK (User Authentication Key) for the authentication of the mobile device is not yet defined with respect to the base station, but only the type of the authentication. For the first allocation of the UAK, which is afterwards used for the mutual authentication of the base station by the mobile device and the mobile device by the base station, the UAK is exchanged once through an over-the-air allocation process. This process is initiated by the base station in the form of a key allocate message to the mobile device, the message containing the type of the authentication and the authentication code, which is also referred to as AC. After reception of the key allocate message by the mobile device, the user of the mobile device is usually requested to enter the authentication code, like a PIN (Personal Identification Number) by means of the keyboard. The mobile device sends the authentication code entered by the user to the base station by means of an authenticate request message. In parallel thereto, the mobile device and the base station mutually authenticate each other based on the authentication code and calculate the UAK based on the DECT standard authenticate algorithm (DSSA) by means of a random number given by the mobile device and the authentication code. If the authentication code entered by the user matches the authentication code deposited at the base station, the UAK is considered as agreed upon between mobile device and base station and is used for mutual authentication in the future, e.g. when establishing a connection.

The UAK is stored, both by the mobile device and by the base station, along with the identity of the mobile device, the identity of the base station as well as the type of the authentication and encryption of the communication connection, the storing operation modifying the system configuration.

In summary, it can be said that the login operation must be started on both sides according to the access rights request process. The base station irradiates a certain signaling (bit a44 in a broadcast message). The mobile device thus identifies a base station ready for login and initiates the login operation.

The described login operation with the over-the-air allocation of the UAK is widespread, in particular in private DECT communication systems, since the login operation is easy to perform, while also providing a high degree of security, since the time window for the login operation is typically limited to 1 minute and the authentication code is known only to the user or owner.

On the other hand, for companies and in particular large companies, the login operation with over-the-air allocation of the UAK generally provides too little protection against abuse by employees or foreigners to the company. Therefore, the login operation in companies usually occurs centrally by the system administration and in particular by mobile devices with a DECT access module (DAM), which can be pre-configured, like a GSM SIM card, and be equipped with an appropriate UAK, so that an insecure input and an over-the-air allocation by an authentication code are omitted. This guarantees maximum security. The base stations for use by companies therefore generally do not provide e.g. any button for activating the readiness for the login operation of the base station.

A drawback of the solution for companies discussed above, either a central login or, in particular, a login through the DECT access module, is the lack of flexibility due to the central login. A central login by the system administration means that each mobile device can be logged-in only by a system administrator. However, when an employee of a company travels e.g. from a location A to a location B and would like to use his mobile device there, he must first go to the system administration, to this end eventually cross the entire company area, hope for a competent system administrator to be present and also to have time then to perform the login. Another possibility consists in that the employee carries with him two mobile devices, one for the location A and another one for the location B, which, in turn, means additional ballast for the employee and that there is the risk that he or she has the wrong mobile device with him or her. All mentioned solutions are impracticable and inefficient in the daily routine in a company.

SUMMARY OF THE INVENTION

According to an embodiment, a mobile device for communicating with a base station according to a communication protocol, the communication protocol having a first message for signaling a readiness of the base station for a normal login operation of the mobile device with the base station and a second message for signaling a readiness of the base station for an ad-hoc login operation of the mobile device with the base station, may have: a receiver, which is formed so as to receive a message of the communication protocol from a base station; an interpreter for interpreting the message based on the communication protocol, the interpreter being formed so as to differentiate the signaling of the readiness of the base station for the normal login operation from the signaling of the readiness of the base station for an ad-hoc login operation; a processor, which is formed so as to perform an ad-hoc login operation with the base station when the readiness of the base station for an ad-hoc login operation is signaled; a first memory for storing a system configuration including normal login information for the normal login operation and a second memory separate from the first memory for storing ad-hoc login information for the ad-hoc login operation; and a terminator for terminating an ad-hoc login of the mobile device, the terminator being formed so as to terminate the ad-hoc login by a command, by a time limit or by switching off the mobile device and to delete the ad-hoc login information in the second memory.

According to another embodiment, a base station for communicating with a mobile device according to a communication protocol, the communication protocol having a first message for signaling a readiness of the base station for a normal login operation of the mobile device with the base station and a second message for signaling a readiness of the base station for an ad-hoc login operation of the mobile device with the base station, may have: a transmitter, which is formed so as to send a message of the communication protocol to a mobile device; a generator for generating the message based on the communication protocol, the generator being formed so as to generate, as a message, the first or the second message, the first message and the second message being different from each other; a processor, which is formed so as to perform, when the base station is ready for an ad-hoc login operation and receives a request for an ad-hoc login operation from the mobile device, an ad-hoc login operation with the mobile device; a first memory for storing a system configuration including normal login information for the normal login operation and a second memory separate from the first memory for storing ad-hoc login information for the ad-hoc login operation; and a terminator for terminating an ad-hoc login of the mobile device, the terminator being formed so as to delete the ad-hoc login information in the second memory by a command, due to a default external event, by a time limit or by switching off the base station.

According to another embodiment, a method for operating a mobile device for communicating with a base station according to a communication protocol, the communication protocol having a first message for signaling a readiness of the base station for a normal login operation of the mobile device with the base station and a second message for signaling a readiness of the base station for an ad-hoc login operation of the mobile device with the base station, in order to achieve a login with the base station, may have the steps of: receiving a message of the communication protocol; interpreting a message based on the communication protocol, in order to differentiate the signaling of the readiness of the base station for the normal login operation from the signaling of the readiness of the base station for an ad-hoc login operation; performing an ad-hoc login operation when the readiness of the base station for an ad-hoc login operation is signaled; storing ad-hoc login information for the ad-hoc login operation in a second memory separate from the first memory, the first memory storing a system configuration including normal login information for the normal login operation; and terminating an ad-hoc login with the base station, terminating being implemented so as to delete the ad-hoc login information in the second memory by a command, by a time limit or by switching off the mobile device.

According to another embodiment, a method for operating a base station for communication with a mobile device according to a communication protocol, the communication protocol having a first message for signaling a readiness of the base station for a normal login operation of the mobile device with the base station and a second message for signaling a readiness of the base station for an ad-hoc login operation of the mobile device with the base station, in order to achieve a login with the base station, may have the steps of: generating either the first or the second message, the first and the second message being different from each other; sending the message; performing the ad-hoc login operation when the base station is ready for an ad-hoc login operation and receives a request for an ad-hoc login operation from the mobile device; storing ad-hoc login information for the ad-hoc login operation in a second memory separate from the first memory, the first memory storing a system configuration including normal login information for the normal login operation; and terminating an ad-hoc login with the base station, terminating being implemented so as to delete the ad-hoc login information in the second memory by a command, due to a default external event, by a time limit or by switching off the base station.

According to another embodiment, a computer program may have a program code for performing, when the computer program is executed on a computer, a method for operating a mobile device for communicating with a base station according to a communication protocol, the communication protocol having a first message for signaling a readiness of the base station for a normal login operation of the mobile device with the base station and a second message for signaling a readiness of the base station for an ad-hoc login operation of the mobile device with the base station, in order to achieve a login with the base station, wherein the method may have the steps of: receiving a message of the communication protocol; interpreting a message based on the communication protocol, in order to differentiate the signaling of the readiness of the base station for the normal login operation from the signaling of the readiness of the base station for an ad-hoc login operation; performing an ad-hoc login operation when the readiness of the base station for an ad-hoc login operation is signaled; storing ad-hoc login information for the ad-hoc login operation in a second memory separate from the first memory, the first memory storing a system configuration including normal login information for the normal login operation; and terminating an ad-hoc login with the base station, terminating being implemented so as to delete the ad-hoc login information in the second memory by a command, by a time limit or by switching off the mobile device.

According to another embodiment, a computer program may have a program code for performing, when the computer program is executed on a computer, a method for operating a base station for communication with a mobile device according to a communication protocol, the communication protocol having a first message for signaling a readiness of the base station for a normal login operation of the mobile device with the base station and a second message for signaling a readiness of the base station for an ad-hoc login operation of the mobile device with the base station, in order to achieve a login with the base station, wherein the method may have the steps of: generating either the first or the second message, the first and the second message being different from each other; sending the message; performing the ad-hoc login operation when the base station is ready for an ad-hoc login operation and receives a request for an ad-hoc login operation from the mobile device; storing ad-hoc login information for the ad-hoc login operation in a second memory separate from the first memory, the first memory storing a system configuration including normal login information for the normal login operation; and terminating an ad-hoc login with the base station, terminating being implemented so as to delete the ad-hoc login information in the second memory by a command, due to a default external event, by a time limit or by switching off the base station.

The present invention is based on the finding that a different signaling of the base station for the readiness for a normal login operation and for the readiness for an ad-hoc login operation allows a distinction between the login information for a normal login operation and the login information for an ad-hoc login operation. Therefore, according to the invention, there is provided a base station for communicating with a mobile device, which can generate and send a signaling of a readiness of the base station for a normal login operation and a signaling, different from the latter, of a readiness of the base station for an ad-hoc login operation, as well as a mobile device for communicating with a base station, which can receive and interpret a signaling of a readiness of the base station for a normal login operation and a message, different from the latter, for a signaling of a readiness for an ad-hoc login operation and can start the ad-hoc login operation. The different signaling according to the invention permits a different treatment of the login information.

An embodiment of a mobile device or a base station is characterized, in particular, in that the login information for an ad-hoc login is not stored, like the login information for a normal login, in the system configuration, but in a separate memory. This provides the advantage that the login information for the ad-hoc login operation can very easily be differentiated from the login information for the normal login operation, e.g. in order to separately display it, analyze it, or to further process it in downstream processes, e.g. in the event of an unauthorized login, in order to easily identify it and to be able to immediately delete it.

A further embodiment of the present invention has a second volatile memory for storing the login information for the ad-hoc login operation, this having the advantage that, when switching off the mobile device or the base station, the login information for the ad-hoc login operation is automatically deleted.

Embodiments of the present invention of a base station or a mobile device are characterized, in particular, in that the communication protocol used for signaling the readiness for login of the base station for an ad-hoc login operation used for communicating uses an escape code defined by the communication protocol, the escape code indicating an application not defined by the communication protocol. This has the advantage that other mobile devices or base stations, which communicate according to the same communication protocol, discard this signaling. In this way, both mobile devices without an ad-hoc login with a base station with an ad-hoc login as well as mobile devices with an ad-hoc login with normal base stations without an ad-hoc login can be operated normally.

Furthermore, embodiments of the present invention are formed so that the mobile device as well as the base station perform, for the ad-hoc login operation, the same communication with the base station or the mobile device as for the normal login operation. This has the important advantage that the adaptation for the introduction of the ad-hoc login is minimal, since only a minimum adaptation effort during the development or thereby also a minimum test effort is necessary, and interoperability between different manufacturers can therefore also very easily be achieved.

An embodiment of the present invention is characterized, in particular, in that it uses the ETSI DECT standard ETS 300 175 as communication protocol. This has the advantage that there occurs a normal so-called "access rights request process", like in a normal login operation, and that the keys necessary for an authentication and for an encryption of the communication connection are thus generated. The readiness for the ad-hoc login operation is signaled via a proprietary broadcast message. A signaling via bit a44 in the Q field, as in a normal login operation, is disadvantageous, since normal/other mobile devices could then try a normal login operation.

Security is ensured, since
1. the identity is checked by an authenticate request (as in a normal login operation). The query of a code is possible here.
2. the readiness for an ad-hoc login operation at the base station and the mobile device must be active, and
3. there is a time window for the ad-hoc login operation.

Furthermore, embodiments of the present invention are characterized, in particular, in that the ad-hoc login of the mobile device can be automatically terminated not only by a command, but e.g. also by a time limit. This has the advantage that no intervention of a system administrator is needed, in order to delete the login.

In summary, the present invention provides, through the introduction of an ad-hoc login operation and the different signaling for the ad-hoc login operation, an ad-hoc login operation, which can easily be performed by the employee as user and does not necessitate carrying simultaneously several mobile devices. Furthermore, the risk of abuse for the company as well as the cost of the system administration can be reduced to a minimum. Thus, e.g. an employee, who does not normally work at the flight handling and whose mobile device is therefore not logged-in there with the base station, may, if necessary, simply register spontaneously via the ad-hoc login operation and take part in a conference circuit of the flight handling service group. The system configuration is not changed thereby, that means e.g. also that the configured user groups remain unchanged. The ad-hoc login information can, furthermore, be deleted e.g. automatically after one hour, so that it is ensured that the communication system permanently stores only normal logins, and that the communication system remains protected against uncontrolled growth of "temporary" logins, which multiply in the course of time and which make the system maintenance substantially more difficult. In contrast to the prior art, this is easy to realize because of the different signaling and the different storage of the ad-hoc login information and the normal login information.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which:

FIG. 1A is a principle block circuit diagram of an embodiment of a mobile device for communicating with a base station according to the present invention.

FIG. 1B is a principle block circuit diagram of an embodiment of a base station for communicating with a mobile device according to the present invention.

FIG. 2 shows the A field (without R CRC) for signaling the readiness for an ad-hoc login operation of the base station of an embodiment of the present invention according to the ETSI DECT standard.

FIG. 4 shows the A field (without R CRC) for signaling the readiness for normal login operation of the base station according to the ETSI DECT standard.

DETAILED DESCRIPTION OF PREFERRED EMBODIMENTS

Figure 3:
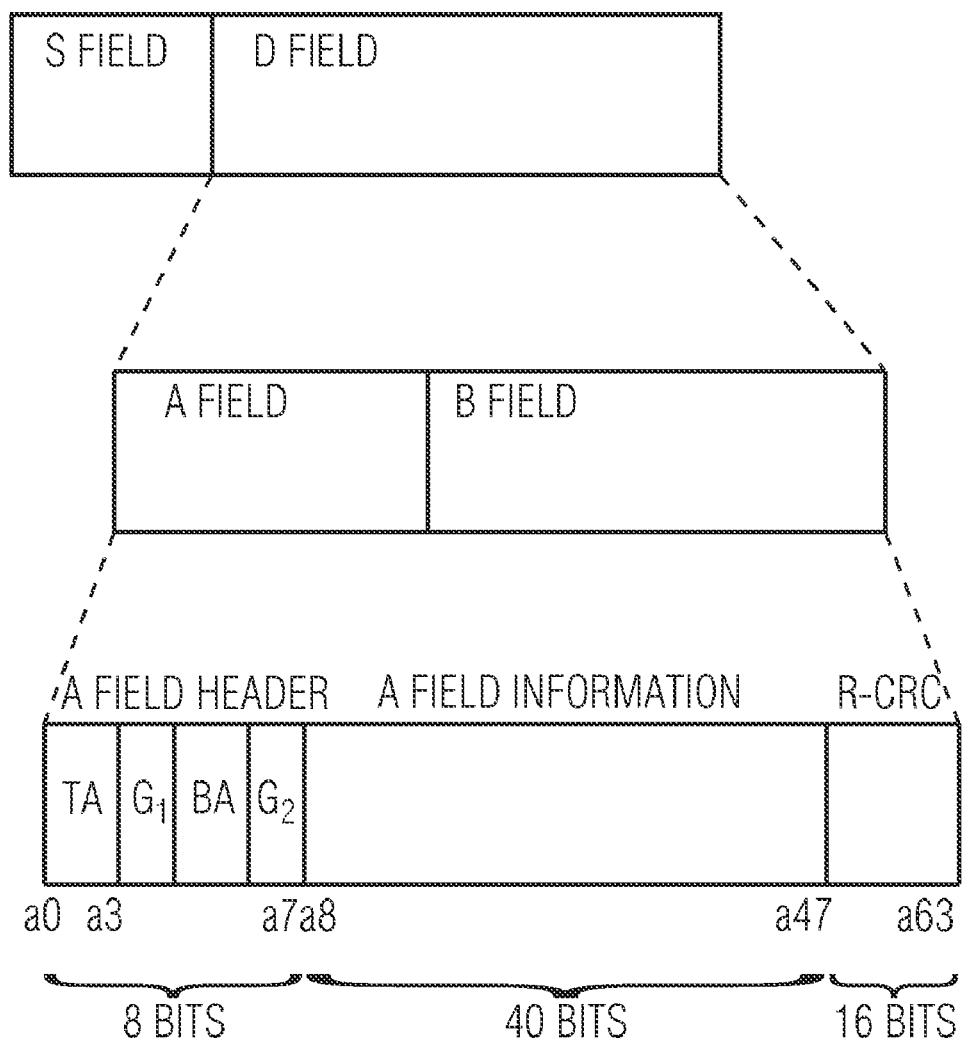
FIG. 3 shows the packet structure according to the ETSI DECT standard.

FIG. 1A shows a block circuit diagram of a mobile device according to the invention 10 for communication with a base station according to a communication protocol, which has a receiver 11 that is formed so as to receive a message of the communication protocol from a base station and to transmit the message to the means 12 for interpreting. The means 12 for interpreting the message based on the communication protocol is formed so as to differentiate the signaling of the readiness of the base station for the normal login operation from the signaling of the readiness of the base station for an ad-hoc login operation and to signal to the processor 13 the readiness of the base station for an ad-hoc login operation. The processor 13 is, in turn, formed so as to perform an ad-hoc login operation with the base station when the readiness of the base station for an ad-hoc login operation is signaled.

Of course, the means 12 can also be integrated with the processor 13, the same functionalities remaining, however, in this case.

Furthermore, in the processor, the usual function of converting voice signals or data signals into signals ready to be sent as well as the procedures defined by the communication protocol are performed.

An embodiment of the mobile device 10 according to the invention further has a first memory 14 for storing normal login information for the normal login operation and a second memory 15 for storing ad-hoc login information for the ad-hoc login operation. The first memory 14 and the second memory 15 are formed so that the processor 13 has reading and writing access to the information contained therein.

Depending on the embodiment, the second memory 15 can be a volatile memory.

An embodiment has, furthermore, a means 16 for placing the mobile device 10 into readiness for an ad-hoc login operation, which is formed so as to activate, in particular, the means 12 for interpreting and the processor 13 for an ad-hoc login operation. Depending on the embodiment, the means 16 for placing can be formed so as to place the mobile device, e.g. through an input by a user of the mobile device, depending on an external event or periodically, into readiness for an ad-hoc login operation.

An embodiment of the mobile device according to the invention may further have a means 17 for terminating an ad-hoc login, whereby the means 17 for terminating can be formed, depending on the exemplary embodiment, so as to terminate the ad-hoc login through an input by the user of the mobile device, through a time limit or through switching off the mobile device. To this end, the means 17 for terminating may, for example, initiate an ad-hoc terminating operation through the processor or delete the ad-hoc login information directly in the second memory 15.

Depending on the embodiment, the means 12 for interpreting is formed so as to search, in a message received through the receiver 11, for an escape code defined by the communication protocol, the escape code indicating an application not defined by the communication protocol, to evaluate a following region of the data stream when the escape code is identified, and to activate the processor in the case of identifying a default occupancy of the further region, so that it starts the ad-hoc login operation. In a particular embodiment, the means 12 for interpreting already activates the processor when it has recognized the escape code.

In another embodiment of the mobile device according to the invention, the processor is formed so as to perform the same communication with the base station in the ad-hoc login operation as in the normal login operation. An embodiment uses the ETSI DECT standard ETS 300 175 as communication protocol and the access rights request process for the ad-hoc login operation, like for the normal login operation.

Embodiments of the mobile device contain furthermore a transmitter 18 for the communication with the base station.

FIG. 1B shows a base station according to the invention, which includes a processor 23 for performing the ad-hoc login operation, a means 22 for generating, which is formed so as to generate, as a message, the first or the second message, the first message and the second message being different from each other, and a transmitter 21, which sends the message for a signaling of a readiness of a base station for an ad-hoc login operation to the means 22 for generating.

Of course, the means 22 can also be integrated with the processor 23, the same functionalities remaining, however, in this case.

An embodiment of the base station according to the invention further has a first memory 24 for storing of normal login information for the normal login operation and a second memory for storing ad-hoc login information for the ad-hoc login operation. The first memory 24 and the second memory 25 are formed so that the processor has reading and writing access.

Depending on the embodiment, the second memory 25 for the ad-hoc login operation can be a volatile memory.

Another embodiment of the base station according to the invention has a means 26 for placing the base station into readiness for the ad-hoc login operation, which controls the means 22 for generating and the processor 23 such that the means 22 for generating generates the second message for a signaling of the readiness for the ad-hoc login operation and the processor starts an ad-hoc login operation only when they are activated for that purpose by the means 26 for placing. Depending on the exemplary embodiment, the means 26 for placing is formed so as to place the base station into readiness for the ad-hoc login operation upon an input by a user of the base station, periodically or depending on a default external event.

Further embodiments of the base station according to the invention have a means 27 for terminating an ad-hoc login of the mobile device, the means 27 for terminating being formed so as to terminate the ad-hoc login by an input by a user of the base station, due to a default external event, by a time limit or by switching off the base station. Depending on the exemplary embodiment, the means 27 for terminating starting, e.g. through the processor 23, an ad-hoc log-out operation or directly deleting the ad-hoc login information in the second memory 25.

Further embodiments of the base station according to the invention are furthermore formed so as to use, for the second message, an escape code defined by the communication protocol, the escape code indicating an application not defined by the communication protocol, and that the second message can be generated so that a region following the escape code has a default unique occupancy.

Depending on the embodiment, the processor is formed so as to perform the same communication with the mobile device in the ad-hoc login operation as in the normal login operation.

Further embodiments use the ETSI DECT standard ETS 300 175 as communication protocol and use furthermore, for the ad-hoc login operation, the same access rights request process as for the normal login operation.

Further embodiments of the base station have a receiver 28 for the communication with the mobile device.

An embodiment of a base station according to the invention and a mobile device according to the invention, which use the ETSI DECT standard as communication protocol, will now be described in greater detail.

The base station sends a special proprietary signaling in order to mark the readiness for the ad-hoc login operation. Proprietary fields are discarded in other DECT systems.

Other trained mobile devices without ad-hoc mode ignore this message, but may be operated normally.

FIG. 2 shows the A field (without R CRC) 40 of an exemplary signaling in the MAC Layer. The A field 40 has, as described in FIG. 3, an A field header 41, which is also referred to as tail header, and the A field information 42, which is also referred to as tail, the first four bits a8 to a11 of which define the Q-channel.

The signaling occurs in a logical channel, which distributes system information (tail identifier TA=100, thus channel $Q_T$). The special channel $Q_H$=7, which is signaled by the escape code "0111", is available for application-specific proprietary information. The proprietary message following in the further tail contains a special tag (IIS Hdr), which characterizes the readiness for an ad-hoc login operation. The bits a16 to a47 can be defined freely, in this example all be provided with the value 0.

During the synchronization, the mobile device only looks for base stations ready for an ad-hoc login operation through evaluating the proprietary signaling. If a mobile device ready for an ad-hoc login operation finds a base station ready for an ad-hoc login operation, the identities and keys are exchanged and stored temporarily, like in a normal login operation. The base station and the mobile device can then establish and disconnect a connection at will.

The ad-hoc login can be terminated by a command, by a time limit or by switching off the modules. The temporary access data is deleted, following establishment of a connection would be rejected. Thus, a mobile device can enter temporarily into communication with a base station by means of an ad-hoc login, without changing the system configuration.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A mobile device for communicating with a base station according to a communication protocol, the communication protocol comprising a first message for signaling a readiness of the base station for a normal login operation of the mobile device with the base station and a second message for signaling a readiness of the base station for a temporary login operation of the mobile device with the base station, comprising:
    a receiver, which is formed so as to receive a message of the communication protocol from a base station;
    an interpreter for interpreting the message based on the communication protocol, the interpreter being formed so as to differentiate the signaling of the readiness of the base station for the normal login operation from the signaling of the readiness of the base station for the temporary login operation;
    a processor, which is formed so as to perform the temporary login operation with the base station when the readiness of the base station for the temporary login operation is signaled;
    a first memory for storing a system configuration including normal login information for the normal login operation and a second memory separate from the first memory for storing temporary login information for the temporary login operation; and
    a terminator for terminating the temporary login operation of the mobile device, the terminator being formed so as to terminate the temporary login by a command, by a time limit or by switching off the mobile device and to delete the temporary login information in the second memory; wherein
    the interpreter is formed so as to search, in a message received, for an escape code defined by the communication protocol, the escape code indicating an application not defined by the communication protocol; and
    the interpreter is formed so as to interpret the message so that a following region of the data stream is evaluated when the escape code is recognized, and, in the event of a default occupancy of the following region, to activate the processor so that it starts the temporary login operation, or to already activate the processor to start the temporary login operation when the message comprises the escape code.

2. The mobile device according to claim 1, wherein the second memory for the temporary login operation is a volatile memory and the first memory is a non-volatile memory.

3. The mobile device according to claim 1, wherein the processor is formed so as to perform, in the temporary login operation, the same communication with the base station as in the normal login operation.

4. The mobile device according to claim 1, further comprising a placer for placing the mobile device into readiness for the temporary login operation, the interpreter or the processor being formed so as to be active for the temporary login operation only when the placer signals the readiness for the temporary login operation.

5. The mobile device according to claim 4, wherein the placer is formed so as to place the mobile device, periodically or depending on an external event, into readiness for the temporary login operation.

6. The mobile device according to claim 1, wherein the processor is formed so as to perform the normal login operation with the base station when the readiness of the base station for the normal login operation is signaled, the normal login operation involving agreement of a user authentication key comprising the normal login information with the base station, wherein the first memory is a non-volatile memory and the processor is configured to perform subsequent connection establishments by authentication with the base station using the user authentication key.

7. The mobile device according to claim 6, wherein the processor is formed so as communicate an access rights request message to the base station in response to the interpreter interpreting the message of the communication protocol from the base station signaling the readiness of the base station for the temporary login operation, the access rights request message containing an identity of the mobile device as well as an authentication type information;
    waiting for an access rights accept message sent from the base station upon communication of the access rights request message, the access rights accept message comprising the identity of the mobile device, an identity of the base station and the authentication type information;
    performing an allocation process along with the base station to obtain the user authentication key agreed upon between the mobile device and the base station; wherein the normal login information comprises the identity of the base station, the authentication type information and the user authentication key.

8. The mobile device according to claim 7, wherein the second memory for the temporary login operation is a volatile memory.

9. The mobile device according to claim 8, wherein the processor is formed so as to perform, in the temporary login operation, the same communication with the base station as in the normal login operation.

10. The mobile device according to claim 6, wherein the second memory for the temporary login operation is a volatile memory.

11. The mobile device according to claim 1, wherein the transmitter is formed so as to broadcast the message of the communication protocol, and the processor is formed so as to perform, when the base station is ready for the normal login operation and receives a request for the normal login operation from another mobile device, the normal login operation with the another mobile device, the normal login operation involving agreement of a user authentication key comprised by the normal login information with the another mobile device, wherein the first memory is a non-volatile memory and the processor is configured to perform subsequent connection establishments by authentication with the other mobile device using the user authentication key.

12. A base station for communicating with a mobile device according to a communication protocol, the communication protocol comprising a first message for signaling a readiness of the base station for a normal login operation of the mobile device with the base station and a second message for signaling a readiness of the base station for a temporary login operation of the mobile device with the base station, comprising:
    a transmitter, which is formed so as to send a message of the communication protocol to a mobile device;
    a generator for generating the message based on the communication protocol, the generator being formed so as to generate, as a message, the first message or the second message, the first message and the second message being different from each other;
    a processor, which is formed so as to perform, when the base station is ready for the temporary login operation and receives a request for the temporary login operation from the mobile device, the temporary login operation with the mobile device;
    a first memory for storing a system configuration including normal login information for the normal login operation and a second memory separate from the first memory for storing temporary login information for the temporary login operation; and
    a terminator for terminating the temporary login operation of the mobile device, the terminator being formed so as to delete the temporary login information in the second memory by a command, due to a default external event, by a time limit or by switching off the base station; wherein
    the generator is formed so as to use, for the second message, an escape code defined by the communication protocol, the escape code indicating an application not defined by the communication protocol, and to generate the second message so that a region following the escape code comprises a default unique occupancy.

13. The base station according to claim 12, wherein the second memory for the temporary login operation is a volatile memory and the first memory is a non-volatile memory.

14. The base station according to claim 12, wherein the processor is formed so as to perform, in the temporary login operation, the same communication with the mobile device as in the normal login operation.

15. The base station according to claim 12, further comprising a placer for placing the base station into readiness for the temporary login operation, the generator being formed so as to generate the second message only when it is activated for by the placer, and the processor further starting the temporary login operation only when it is activated to this end by the placer.

16. The base station according to claim 15, wherein the placer is formed so as to place the base station, periodically or depending on a default external event, into readiness for the temporary login operation.

17. The base station according to claim 12, wherein the processor is formed so as to perform, when the base station is ready for the normal login operation and receives a request for the normal login operation from the mobile device, the normal login operation with the mobile device, the normal login operation involving agreement of a user authentication key comprising the normal login information with the mobile device, wherein the first memory is a non-volatile memory and the processor is configured to perform subsequent connection establishments by authentication with the mobile device using the user authentication key.

18. A method for operating a mobile device for communicating with a base station according to a communication protocol, the communication protocol comprising a first message for signaling a readiness of the base station for a normal login operation of the mobile device with the base station and a second message for signaling a readiness of the base station for a temporary login operation of the mobile device with the base station, in order to achieve a login with the base station, comprising the steps of:
    receiving a message of the communication protocol;
    interpreting a message based on the communication protocol, in order to differentiate the signaling of the readiness of the base station for the normal login operation from the signaling of the readiness of the base station for the temporary login operation;
    performing the temporary login operation when the readiness of the base station for the temporary login operation is signaled;
    storing temporary login information for the temporary login operation in a second memory separate from the first memory, the first memory storing a system configuration including normal login information for the normal login operation; and
    terminating the temporary login operation with the base station, terminating being implemented so as to delete the temporary login information in the second memory by a command, by a time limit or by switching off the mobile device; wherein
    the step of interpreting the message comprises:
        searching, in a message received, for an escape code defined by the communication protocol, the escape code indicating an application not defined by the communication protocol; and
        interpreting the message so that a following region of a data stream is evaluated when the escape code is recognized, and, in the event of a default occupancy of the following region, activating a start of the step of performing the temporary login operation, or already activating the start of the step of performing the temporary login operation when the message comprises the escape code.

19. A method for operating a base station for communication with a mobile device according to a communication protocol, the communication protocol comprising a first message for signaling a readiness of the base station for a normal login operation of the mobile device with the base station and a second message for signaling a readiness of the base station for a temporary login operation of the mobile device with the base station, in order to achieve a login with the base station, comprising the steps of:

generating either the first or the second message, the first and the second message being different from each other;

sending the message;

performing the temporary login operation when the base station is ready for the temporary login operation and receives a request for the temporary login operation from the mobile device;

storing temporary login information for the temporary login operation in a second memory separate from the first memory, the first memory storing a system configuration including normal login information for the normal login operation; and terminating the temporary login with the base station, terminating being implemented so as to delete the temporary login information in the second memory by a command, due to a default external event, by a time limit or by switching off the base station; wherein the step of generating uses, for the second message, an escape code defined by the communication protocol, the escape code indicating an application not defined by the communication protocol, so that a region following the escape code comprises a default unique occupancy.

20. A non-transitory computer readable medium having stored thereon a computer program with a program code for performing, when the computer program is executed on a computer, a method for operating a mobile device for communicating with a base station according to a communication protocol, the communication protocol comprising a first message for signaling a readiness of the base station for a normal login operation of the mobile device with the base station and a second message for signaling a readiness of the base station for a temporary login operation of the mobile device with the base station, in order to achieve a login with the base station, the method comprising the steps of:

receiving a message of the communication protocol;

interpreting a message based on the communication protocol, in order to differentiate the signaling of the readiness of the base station for the normal login operation from the signaling of the readiness of the base station for the temporary login operation;

performing the temporary login operation when the readiness of the base station for the temporary login operation is signaled;

storing temporary login information for the temporary login operation in a second memory separate from the first memory, the first memory storing a system configuration including normal login information for the normal login operation; and terminating the temporary login operation with the base station, terminating being implemented so as to delete the temporary login information in the second memory by a command, by a time limit or by switching off the mobile device; wherein the step of interpreting the message comprises:

searching, in a message received, for an escape code defined by the communication protocol, the escape code indicating an application not defined by the communication protocol; and interpreting the message so that a following region of a data stream is evaluated when the escape code is recognized, and, in the event of a default occupancy of the following region, activating a start of the step of performing the temporary login operation, or already activating the start of the step of performing the temporary login operation when the message comprises the escape code.

21. A non-transitory computer readable medium having stored thereon a computer program with a program code for performing, when the computer program is executed on a computer, a method for operating a base station for communication with a mobile device according to a communication protocol, the communication protocol comprising a first message for signaling a readiness of the base station for a normal login operation of the mobile device with the base station and a second message for signaling a readiness of the base station for a temporary login operation of the mobile device with the base station, in order to achieve a login with the base station, the method comprising the steps of:

generating either the first or the second message, the first and the second message being different from each other;

sending the message;

performing the temporary login operation when the base station is ready for the temporary login operation and receives a request for the temporary login operation from the mobile device;

storing temporary login information for the temporary login operation in a second memory separate from the first memory, the first memory storing a system configuration including normal login information for the normal login operation; and terminating the temporary login operation with the base station, terminating being implemented so as to delete the temporary login information in the second memory by a command, due to a default external event, by a time limit or by switching off the base station; wherein the step of generating uses, for the second message, an escape code defined by the communication protocol, the escape code indicating an application not defined by the communication protocol, so that a region following the escape code comprises a default unique occupancy.

\* \* \* \* \*